(12) United States Patent
Mueller et al.

(10) Patent No.: US 10,247,153 B2
(45) Date of Patent: Apr. 2, 2019

(54) HEATING DEVICE FOR A FLUID LINE (71) Applicant: MANN+HUMMEL GMBH, Ludwigsburg (DE)

(72) Inventors: Udo Mueller, Mengersgereuth-Haemmern (DE); Peter Hoehn, Sonneberg (DE); Ralf Werner, Steinach (DE); Thomas Lenk, Mengersgereuth-Haemmern (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 418 days.

(21) Appl. No.: 14/604,735

(22) Filed: Jan. 25, 2015

(65) Prior Publication Data

US 2015/0139632 A1   May 21, 2015

Related U.S. Application Data

(63) Continuation of application No. PCT/EP2013/065588, filed on Jul. 23, 2013.

(30) Foreign Application Priority Data

Jul. 26, 2012   (DE) .................. 10 2012 014 746

(51) Int. Cl.
*H05B 3/06*       (2006.01)
*H05B 3/42*       (2006.01)
*F01M 13/00*      (2006.01)
*F02M 53/02*      (2006.01)
*F16L 53/35*      (2018.01)

(52) U.S. Cl.
CPC ............ *F02M 53/02* (2013.01); *F01M 13/00* (2013.01); *F16L 53/35* (2018.01); *H05B 3/06* (2013.01);
(Continued)

(58) Field of Classification Search
CPC ........ F16L 53/005; F16L 53/35; F02M 31/12; F02M 53/02; H05B 3/22; H05B 3/42;
(Continued)

(56) References Cited

U.S. PATENT DOCUMENTS 4,791,277 A * 12/1988 Montierth ................. E03B 7/12
                                                      219/535
2004/0251248 A1* 12/2004 Wickel ................... F02M 31/12
                                                      219/535
(Continued)

FOREIGN PATENT DOCUMENTS

DE       19846282 A1    4/2000
DE       10325965 A1   12/2004
(Continued)

*Primary Examiner* — Tu B Hoang
*Assistant Examiner* — Erin E McGrath
(74) *Attorney, Agent, or Firm* — James Hasselbeck (57) ABSTRACT

A heating device for a fluid line has a heat-conductive pipe segment to be flowed through by a fluid. An electrical heating element that heats the pipe segment is provided. An electrical plug connection device is provided, wherein contact elements connect the heating element electrically to the plug connection device. A fastening element attaches the heating element and the contact elements to the pipe segment. A plastic housing encapsulates the fastening element, the heating element, and the pipe segment.

11 Claims, 8 Drawing Sheets

(52) U.S. Cl.
CPC ....... *H05B 3/42* (2013.01); *F01M 2013/0027* (2013.01); *H05B 2203/022* (2013.01); *Y02T 10/126* (2013.01)

(58) Field of Classification Search
CPC ........ H05B 2203/021; H05B 2203/022; F01M 2013/0027; F01M 2013/0455; F01M 2013/0472; H01R 13/005
USPC .................. 392/478–480, 482, 483, 485–490
See application file for complete search history.

(56) References Cited

U.S. PATENT DOCUMENTS

| | | | | |
|---|---|---|---|---|
| 2006/0144376 | A1* | 7/2006 | Gschwind | F01M 13/00 123/573 |
| 2007/0186913 | A1* | 8/2007 | Ideguchi | F01M 13/04 123/574 |
| 2007/0210107 | A1* | 9/2007 | Pleschinger | H05B 3/04 222/153.06 |

FOREIGN PATENT DOCUMENTS

| | | |
|---|---|---|
| DE | 602004011246 T2 | 1/2009 |
| DE | 102010033757 A1 | 2/2012 |
| EP | 1375998 A1 | 1/2004 |
| EP | 1375999 A1 | 1/2004 |
| EP | 1433994 A1 | 6/2004 |
| EP | 1505135 A1 | 2/2005 |
| EP | 1674678 A1 | 6/2006 |
| EP | 1772613 A1 | 4/2007 |

\* cited by examiner

HEATING DEVICE FOR A FLUID LINE

CROSS-REFERENCE TO RELATED APPLICATIONS

This application is a continuation application of international application No. PCT/EP2013/065588 having an international filing date of 24 Jul. 2013 and designating the United States, the International Application claiming a priority date of 26 Jul. 2012, based on prior filed German patent application No. 10 2012 014 746.5, the entire contents of the aforesaid international application and the aforesaid German patent application being incorporated herein by reference.

BACKGROUND OF THE INVENTION

The invention concerns a heating device for a fluid line, preferably for a gas fluid line, in particular for a venting line of a crankcase of an internal combustion engine.

Heating devices for fluid lines are widely known in plant construction and are used in particular in internal combustion engines in order to heat liquids or gases in ducts to a predetermined temperature level. For example, inter alia heating devices for urea water solutions for diesel injection systems are known, but also heating devices for blowby gases of a crankcase venting device.

In internal combustion engines blowby gases occur which are produced in that combustion gases in the cylinder flow past the cylinder piston into the crankcase. These blowby gases that contain uncombusted hydrocarbons cause an increase of pressure within the crankcase and this may lead to leakage and escape of oil. In order to avoid a pressure increase and in order to discharge the blowby gases in an environmentally friendly way, they are returned from the crankcase into the air intake manifold of the internal combustion engine. Due to the high pressure differences between crankcase and air intake region, the gases generally cool down and there is the risk of condensation, wherein dirt particles deposit in the air intake manifold and cause soiling. For this reason, heating devices are employed in the venting valves or in the crankcase venting lines wherein, by means of a PTC element (positive temperature coefficient element—thermistor) the returned gases are heated to a desired temperature. PTC elements are comprised in general of a semiconductive polycrystalline ceramic, for example, barium titanate, that are ready-made in a disc or plate shape and are supplied with electric current by means of metallic contact elements. Such heating devices in general comprise a pipe or duct segment of thermally conductive material, for example, copper, aluminum or steel, through which the fluid to be heated can flow, wherein the pipe segment is coupled with an electrical heating element for heating the pipe segment. The electrical heating element is in general connected by an electrical plug connection device with the electric power supply of the internal combustion engine.

The prior art discloses heating devices which are in part sealed against aggressive blowby gases wherein a heating element is soldered onto a pipe segment or is glued on by means of a heat-conductive adhesive. Moreover, it is known to attach by injection-molding an electrical plug connection device to the pipe segment wherein the heating element as well as its electrical contacts are pressed by means of a spring force onto the pipe segment. Finally, shrunk-on heating elements or pressed-in or caulked heating elements on a pipe segment are known that are embedded in a plastic housing by injection molding.

DE 10 2007 026 805 A1 discloses a heating device wherein a heating element on a pipe segment is embedded by injection molding in a plastic housing and multi-layer lamination sealing rings are arranged for sealing on the two axial ends of the pipe segment. The heating element is fused by means of the plastic housing immediately onto the pipe segment.

EP 1 772 613 A1 discloses a heating device in which a heating element is pressed by a contact spring onto a pipe segment wherein the contact spring is fused within a plastic housing and is formed with a plug connection device.

In addition, DE 103 26 894 B3 discloses a heating device which can be attached like a clamp about a duct. The heating element is encapsulated in a plastic housing on an axial projection of the wrap-around clamp wherein the heating element is pressed onto the heat-conductive projection of the pipe clamp.

Based on the aforementioned prior art, it is the object of the invention to propose a heating device that enables a simple manufacture, offers an improved insulation relative to blowby gases, and provides a high electrical and thermal contacting quality.

SUMMARY OF THE INVENTION

The aforementioned object is solved by a heating device for a fluid line in which a fastening element clamps a heating element onto the pipe segment to be heated wherein fastening element, heating element, and pipe segment are encapsulated in a plastic housing. Moreover, the object is solved by a fluid line that encompasses such a heating device.

The invention is based on a heating device for a fluid line, preferably for a gas fluid line, in particular for a venting device of a crankcase of an internal combustion engine, that comprises a thermally conductive pipe segment flowed through by the fluid, an electrical heating element for heating the pipe segment, and an electrical plug connection device. The heating element is electrically connected by contact elements with the plug connection device. The heating element and the contact elements are attached to the pipe segment by a fastening element, and the fastening element, the heating element, and the pipe segment are encapsulated in a plastic housing.

In other words, the invention concerns a heating device in which a heating element, in particular a PTC conductor that comprises contact elements for electrical contacting, is screwed on, riveted on, glued on, or attached in other ways to a heat-conductive pipe segment by means of a fastening element, in particular a plastic element. The plastic element presses the heating element onto the region of the pipe segment that is to be heated. Subsequently, the fastening element with the pressed-on heating element is embedded by injection molding in a plastic housing and is thereby encapsulated. Since the heating element is not directly embedded by injection molding into a plastic housing, but first is attached by the fastening element mechanically to the pipe segment, electrical contacting and defined attachment of the heating element on the heat-conductive pipe segment can be ensured independent of embedding by plastic injection molding. The plastic housing serves only as a protection against outer environmental influences and can provide gas-tight encapsulation. Moreover, the plastic housing forms the housing of the plug connection device wherein the contact elements which are connected immediately with the heating element may project into the plug connection device. Due to the attachment of the heating element on the pipe segment by means of a fastening element, the intermediate product can be electrically tested preliminarily and corrections without causing destruction can be performed before finally a plastic housing is injection-molded thereon. The fastening element secures the heating element on the region of the pipe segment that is to be heated and guarantees a good heat conductivity as well as electrical contacting of the heating element through the contact elements so that a mechanical decoupling from the plastic housing is achieved. In contrast to corrosion-sensitive soldering, conductive adhesive connection of the heating element on the pipe segment, mechanical caulking of the heating element or a direct embedding by plastic injection molding of the heating element by means of a plastic housing, the fastening element as a pre-fabricated component can ensure a quick, robust, and contact-reliable assembly of the heating element on the pipe segment. Subsequently, the pre-manufactured component can be embedded by injection molding with a plastic housing of any shape in accordance with the requirements of a specific application.

The plastic housing accommodates the plug connection device and decouples the heating element mechanically from the plug connection device so that forces upon electrical contacting. i.e., pushing a plug into the plug connection device, have no effect on the attachment and contacting of the heating element on the pipe segment. In case of direct injection molding of the plastic housing about the heating element, high mechanical pressures as well as temperatures occur so that the risk of damage exists. The heating element can be connected with form fit by the fastening element on the pipe segment. Electrical contacting is not impaired upon embedding by injection molding. The heating element and the contact elements are protected against mechanical and thermal load during subsequent processes, in particular during injection molding and, in this context, in particular against the injection molding pressure and the processing temperature. Due to the fastening element and the subsequent embedding by plastic injection molding, a receiving chamber in which the heating element is located is protected from penetration of blowby gases and no metal migration can occur so that short circuits as a result of exterior soiling can be avoided. By using standardized fastening elements, automatic assembly of the heating device can be performed very quickly and cost-effectively. Moreover, due to the consequent realization of the two-step assembly a functional test of the intermediate product can be performed so that the error rate can be lowered and the housing shape of the heating device can be matched simply to constructive specifications.

In accordance with an advantageous further embodiment of the invention, a spring element for exerting a contact force from the heating element onto the pipe segment can be arranged between fastening element and heating element. The spring element exerts a contact force between the fastening element and the heating element in such a way that the heating element can be pressed areally with thermal contact onto a region of the pipe segment that is to be heated. The strength of the contact force of the spring element can be varied. The spring element can be, for example, a pressure spring, a conical spring, a spring disc, a plate spring or a spring tongue and can press alternatively the electrical contacts of the contact elements together with the heating element or only the heating element alone onto the region of the pipe segment that is to be heated. The spring element can produce an electrical contact between the contact element and a contact side of the heating element. It is furthermore conceivable that the spring element is an elastic O-ring or an elastic shaped part, for example, a rubber ring or elastomer shaped part, that in particular can perform also sealing tasks. Due to the intermediate arrangement of a spring element between fastening element and heating element, an areal thermal contacting for heat transfer between heating element and pipe segment is provided.

In an advantageous further embodiment, a sealing element for fluid sealing of the heating element can be arranged between fastening element and heating element. By arrangement of the heating device in a fluid line, in particular in case of machine use in a rough environment, aggressive gases, for example, blowby gases, can penetrate into the housing of the heating device and can cause corrosion or soiling on the heating element so that electrical as well as thermal transfer resistances are formed and, therefore, the efficiency or the function of the heating device can be impaired. Due to the arrangement of a sealing element between fastening element and heating element, a sealing action of the heating element can be provided and thereby the electrical contacting between contact element and heating element as well as the heat transfer between heating element and pipe segment can be sealed relative to the environment so that, over an extended service life, no soiling and thus no deterioration of the electrical and thermal properties of the heating device can occur.

In an advantageous further embodiment, the sealing element may encompass the spring element so that the sealing element, which in general is produced of a soft sealing elastomer, can provide a springy action for providing a contact force of heating element onto the pipe segment. Accordingly, the number of components is reduced, the mounting process is simplified, and a dual utilization of the sealing element is achieved.

In principle, the fastening element can be attached in any way on the pipe segment, for example, may surround the pipe segment with form fit or can be pressed onto the pipe segment or caulked onto it. According to an advantageous further embodiment, the fastening element can be locked onto the pipe segment, screwed on or glued on. It is particularly advantageous when the fastening element is comprised of a pre-manufactured plastic part, encompasses the locking elements, and can be locked on locking edges or recesses of the pipe segment. Alternatively, it is conceivable that the fastening element is glued onto the pipe segment by means of a suitable heat-resistant adhesive or is screwed onto a thread-like projection of the pipe segment. By a mechanical attachment, in particular locking or screwing of the fastening element on the pipe segment, a force-fit and form-fit connection is provided so that the heating element is compressed between fastening element and pipe segment and at least partially encapsulated and exhibits electrically as well as heat-conductingly a high connecting quality.

In accordance with an advantageous further embodiment, the pipe segment can comprise a projection on which the fastening element is attached wherein the projection is in particular flat or cylindrical and preferably monolithically formed on an axial end of the pipe segment and preferably comprises angled longitudinal edge areas on which the fastening element can be attached, in particular can be locked or clamped. Accordingly, the projection can be extending like a tongue from an axial end of the pipe segment or can project from any location on the circumferential wall surface of the pipe segment. In this further embodiment, it is proposed that the fastening element is not arranged immediately on the pipe segment but on a flat or cylindrical projection of the pipe segment, wherein the projection can be arranged axially at an end and, for example, can be oriented at an adjustable angle relative to the pipe segment. Accordingly, the heating device can be attached in any manner on the projection, in particular locked or clamped on, wherein the actual pipe segment is decoupled from the projection functionally and is heat-conductingly connected by means of the monolithic configuration. The projection can project at an angle relative to the pipe segment so that a predetermined mounting space for integration of the heating device can be optimally utilized. The projection can be designed such that the fastening element can be locked on, screwed on, clamped on or glued on and can comprise in particular angled longitudinal edges and a flat central area onto which the heating element can be placed. Accordingly, in particular the pipe segment can be of a round shape and the projection can have a flat surface, on which the heating element is seated, as well as angled longitudinal edges on which a bracket-shaped fastening element can be locked.

According to an advantageous further embodiment of the invention, the fastening element can have a substantially U-shaped cross-sectional profile relative to the pipe segment axis wherein the lateral flanks of the fastening element comprise locking elements for locking a pipe segment and the central flank comprises push-through openings for the contact elements. In this further embodiment, it is proposed that the fastening element is formed as a bracket-shaped or channel-shaped plastic part that has a U-shaped cross-section and that comprises locking elements at its lateral edges with which it is locked or clamped in locking recesses, for example, on a projection of the pipe segment or on the pipe segment itself. In the central flank, push-through openings can be provided for passing through contact elements which are in electrical contact with the heating element, wherein the contact elements extend in the direction toward the plug connection device in order to contact, as terminals, an inserted plug. Such a channel-shaped or bracket-shaped configuration of the fastening element enables an effective locking action or adhesive connection and offers within the central flank space for receiving the heating element that can be arranged preferably in a recess of the central flank in a shape-adapted way.

In an advantageous further embodiment, the heating device can comprise a sealing element, wherein the sealing element can be inserted in a shape-complementary way into a support frame of the fastening element which frames the region of the pipe segment that is to be heated by the heating element, wherein the sealing element is projecting past the support frame in the direction toward the region of the pipe segment surface that is to be heated. This exemplary embodiment proposes that, within the side of the fastening element that is facing the pipe segment and below which the heating element is arranged, a sealing element is inserted into a support frame of the fastening element in a shape-complementary way, wherein the sealing element is projecting relative to the support frame in the direction toward the pipe segment so that, when locking or gluing the fastening element onto the pipe segment, a sealing pressure action is exerted on the elastic sealing element and, in this way, the frame area between pipe segment surface and fastening element in which the heating element is arranged is sealed by the sealing element. In this way, a fluid-tight space is formed in which the heating element with the electrical contacts is arranged.

In an advantageous further embodiment, the heating element can be disk-shaped wherein each contact element comprises a contact part which is substantially shape-complementary relative to the disk surface of the heating element for electrically contacting the disk surface, and a pin-shape terminal part, wherein the terminal part can be pushed through a push-through opening of the fastening element and/or of the sealing element in the direction of the plug connection device and preferably is oriented at a right angle to the contact part. In other words, it is proposed that the heating element is formed as a disk, in particular as a circular disk, and the contact elements are on a contact part, shaped in accordance with the disk surface and also shaped as a disk, and a terminal part that is designed as a terminal pin or terminal bracket with round, rectangular or square cross-section, wherein the terminal part as a plug part can be guided into the plug connection device and can be pushed through via push-through openings of the sealing element and/or the fastening element. As a result of the push-through guiding action of the terminal part through the push-through openings of the sealing element, the sealing element seals hermetically the contact elements within the push-through area so that contaminants or dirt cannot penetrate along the contact elements into the heating element. Due to the areal contacting of the contact surfaces with a contacting surface of the heating element an extremely low transfer resistance can be generated. Since the contact elements exhibit a high conductivity, they conduct in particular heat very well so that the sandwich-type structuring of contact element, heating element and further contact element provides, on the one hand, good electrical as well as good heat-technical coupling of the heating element on the pipe segment. The terminal parts are quasi components of the plug connection device and can be connected directly by a plug coupling with an electrical network of a device or machine for electrical current supply of the heating element. Accordingly, a minimal number of components is required in order to provide the heating device.

It is moreover conceivable that in a comparable configuration, a temperature-changeable resistance element as a temperatures sensor is used instead of the heating element or in addition to the heating element so that a control of the heating device is enabled or the device is useable as a temperature sensor device. For this purpose, in place of or in addition to the heating element, a temperature-changeable resistance element can be used between fastening element and pipe segment.

In a secondary aspect, the invention concerns a fluid line for an internal combustion engine, preferably a gas fluid line, in particular a venting line for a crankcase, that comprises a heating device according to one of the aforementioned embodiments. Such a fluid line can be formed as a single piece and can receive such a heating element at one of the line ends or can be comprised of two individual line parts which are connected at the heating element, for example, by means of clamps or shrink-on connectors, to the pipe segment of the heating device. The fluid line can be a pipe conduit or a hose conduit. The fluid line comprises thus a heating device and can heat a fluid to be passed through to a desired temperature and, for example, can protect from freezing or precipitation of contaminants.

BRIEF DESCRIPTION OF THE DRAWINGS

Further advantages result from the following description of the drawings. In the drawings, embodiments of the invention are illustrated. The drawings, the description, and the claims contain numerous features in combination. A person of skill in the art will expediently consider the features also individually and combine them to other meaningful combinations.

PREFERRED EMBODIMENTS OF THE INVENTION

In the Figures same or same-type components are identified with same reference characters. The Figures show only examples and are not to be understood as limiting.

Figure 1:
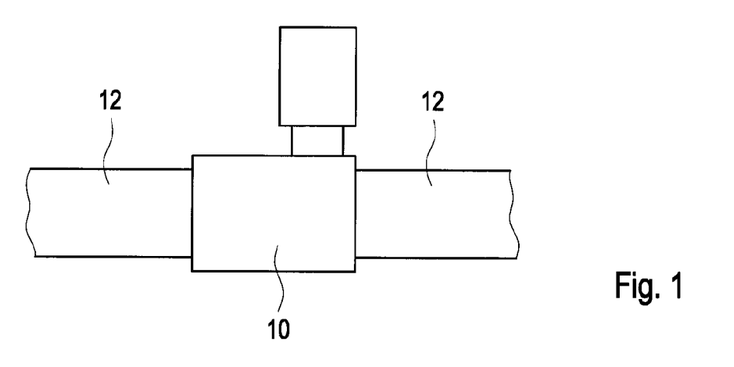
FIG. 1 shows a fluid line with an embodiment of a heating device.

In FIG. 1, a fluid line 12 is illustrated in which a heating device 10 according to one embodiment of the invention is arranged. A fluid, for example, blowby gases, is guided from a crankcase in the direction of an air intake area of an internal combustion engine and passed through the heating device 10 through flexible conduit hoses 12, which are connected fluid-tightly with the heating device 10 by conduit connector elements, for example, pipe clamps. By means of the heating device 10, the fluid is heated so that, for example, upon expansion, it will not condense or freeze at low temperatures.

Figure 2:
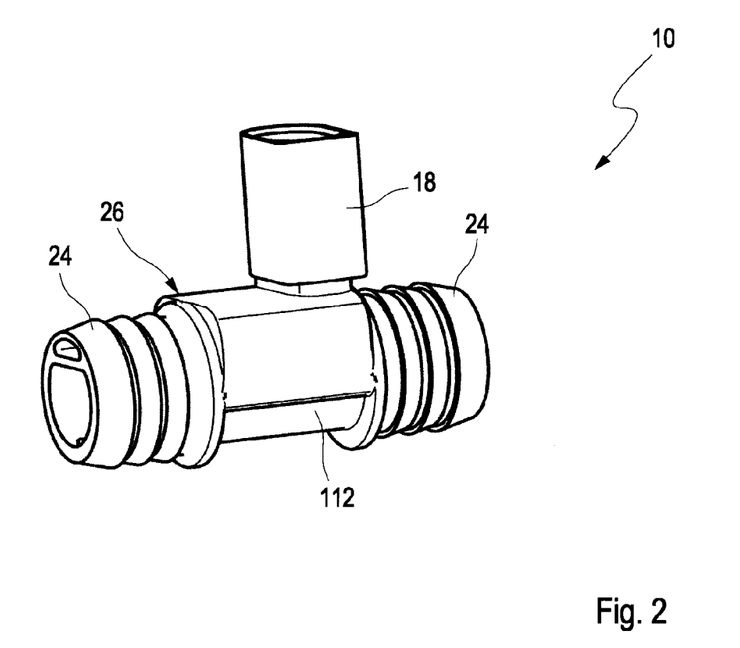
FIG. 2 shows in a perspective view a heating device according to one embodiment of the invention.

In FIG. 2, a plastic housing 26 of a heating device 10 is illustrated in a perspective view. The plastic housing 26 comprises at its two axial ends in longitudinal direction two line connecting areas 24 for connecting to fluid lines 12 that, for example, are embodied as a pipe or hoses. In the central heating area 112, a heating element is arranged within a heat-conductive pipe segment that heats the fluid flowing through. For electrical contacting, a plug connection device 18 is provided into which a plug coupling is inserted and, in this way, the heating element can be supplied with electrical energy.

Figure 3:
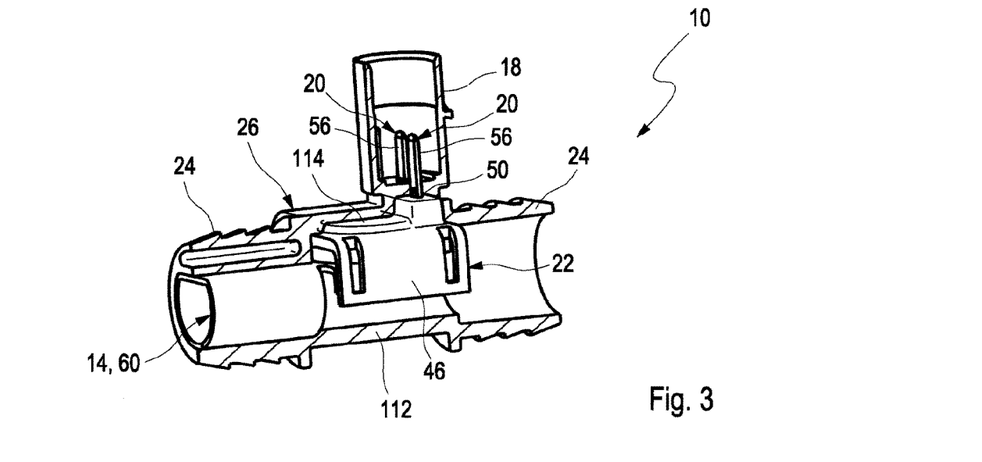
FIG. 3 is an illustration, cross-sectional in part, of the embodiment according to FIG. 2.

In FIG. 3, a longitudinal section view in part of the heating device 10 illustrated in FIG. 2 is shown. For this purpose, the plastic housing 26 is illustrated in section view in which a pipe segment 60, for example, comprised of copper or aluminum, with a monolithically formed flat projection 42 is arranged. A fluid can be guided through the pipe segment 14 wherein a heating element 16, which is pressed onto the projection 42 underneath a saddle-shaped fastening element 22 locked onto the projection 42, can transfer heat onto the pipe segment 14. At the central flank 48 (also referred to as the central base member 48) of the fastening element 22 a receiving area 114 is provided into which the disk-shaped heating element 16 is fitted. The terminals 56 of the two contact elements 20 project into the cup-shaped plug connection device 18 in order to be electrically contacted by a plug-coupling which is not illustrated. On both lateral flanks 46 of the fastening element 22, locking elements 36 are provided which lock at the projection 42 of the pipe segment 14.

Figure 4:
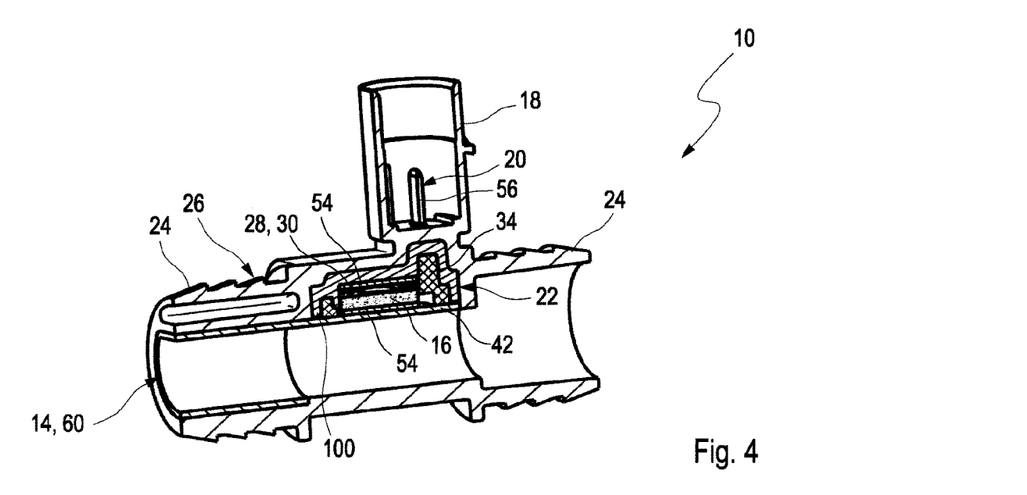
FIG. 4 shows a cross-sectional illustration of the embodiment according to FIG. 2.

Based on FIG. 3, in FIG. 4 a longitudinal cross-section of the heating device 10 according to FIG. 2 is illustrated. In this context, the disk-shaped heating element 16 is illustrated in section at the center and has an areal connection with the projection 42 of the pipe segment 14. Below and above the heating element 16, disk-shaped contact parts 54 of the contact element 20 are arranged which electrically contact the PTC heating element 16. A sealing element 34 encloses the heating element 16 and has push-through openings through which the terminals 56 are extending and, in this way, seals the heating element 16 relative to the environment. The terminal 56 is moreover pushed through a push-through opening of the fastening element 22. For pressing the heating element 16 and the two contact elements 20 onto the flat projection 42 of the pipe segment 14, a spring element 28 is provided that is arranged between the sealing element 34 and first contact element 20 and presses first contact element 20, heating element 16, and second contact element 20 against the heat-conductive surface of the projection 42 of the pipe segment 14.

Figure 5:
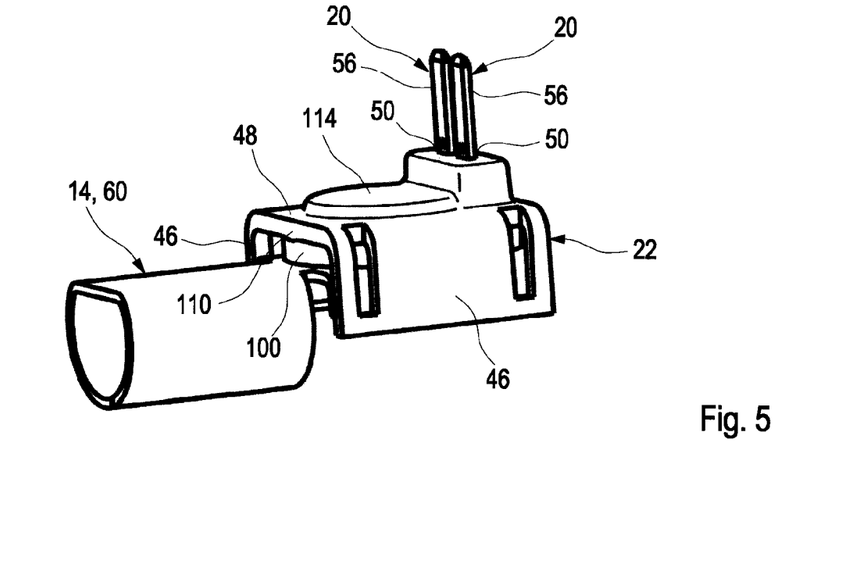
FIG. 5 shows a pipe segment with heating element and fastening element for use in the embodiment according to FIG. 2.
Figure 6:
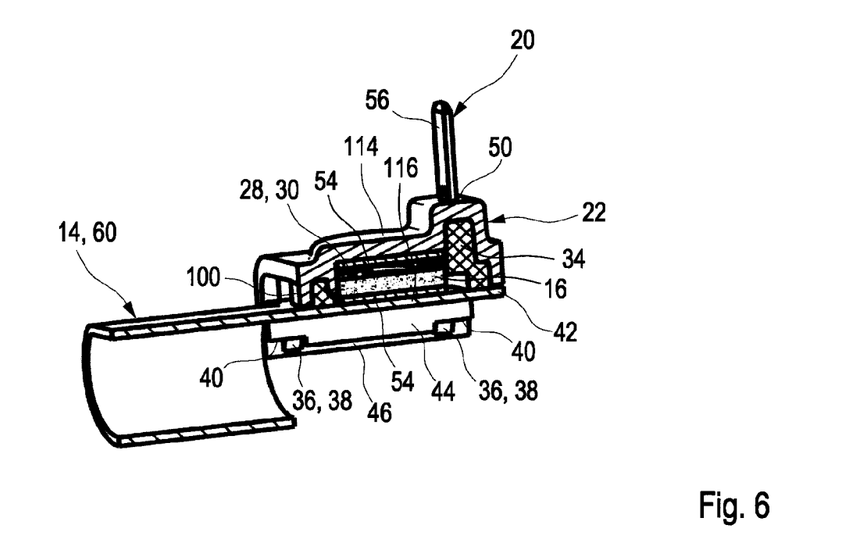
FIG. 6 is a cross-sectional illustration of the pipe segment illustrated in FIG. 5 with heating element and fastening element.

In FIG. 5, the pipe segment 14 with flat projection 42, the locked-on U-shaped fastening element 22, and the terminals 56 of the contact elements 20 that can be contacted by a plug coupling are illustrated. FIG. 6 shows in this respect a section view through the pipe segment according to FIG. 5. In both lateral flanks 46 of the fastening element 22 locking noses 38 as locking elements 36 are arranged which engage locking edges 40 of the angled left edge area 44 of the flat projection 42 in order to lock the fastening element 22 on the pipe segment 14. Between pipe fastening element 22 and pipe segment 14, a sealing element 34 of elastomer is arranged below which a spring element 28 presses the two contact parts 54 of the contact elements 20 and the heating element 16 onto the surface 116 of the pipe segment 14.

In FIGS. 7, 8, 9, and 10, four exploded illustrations are illustrated which show in detail the sandwich-type configuration of pipe segment 14, first contact element 20, heating element 16, second contact element 20, sealing element 34, and fastening element 22 wherein the embodiment and position of the spring element 28 are varied with respect to the configuration.

Figure 7:
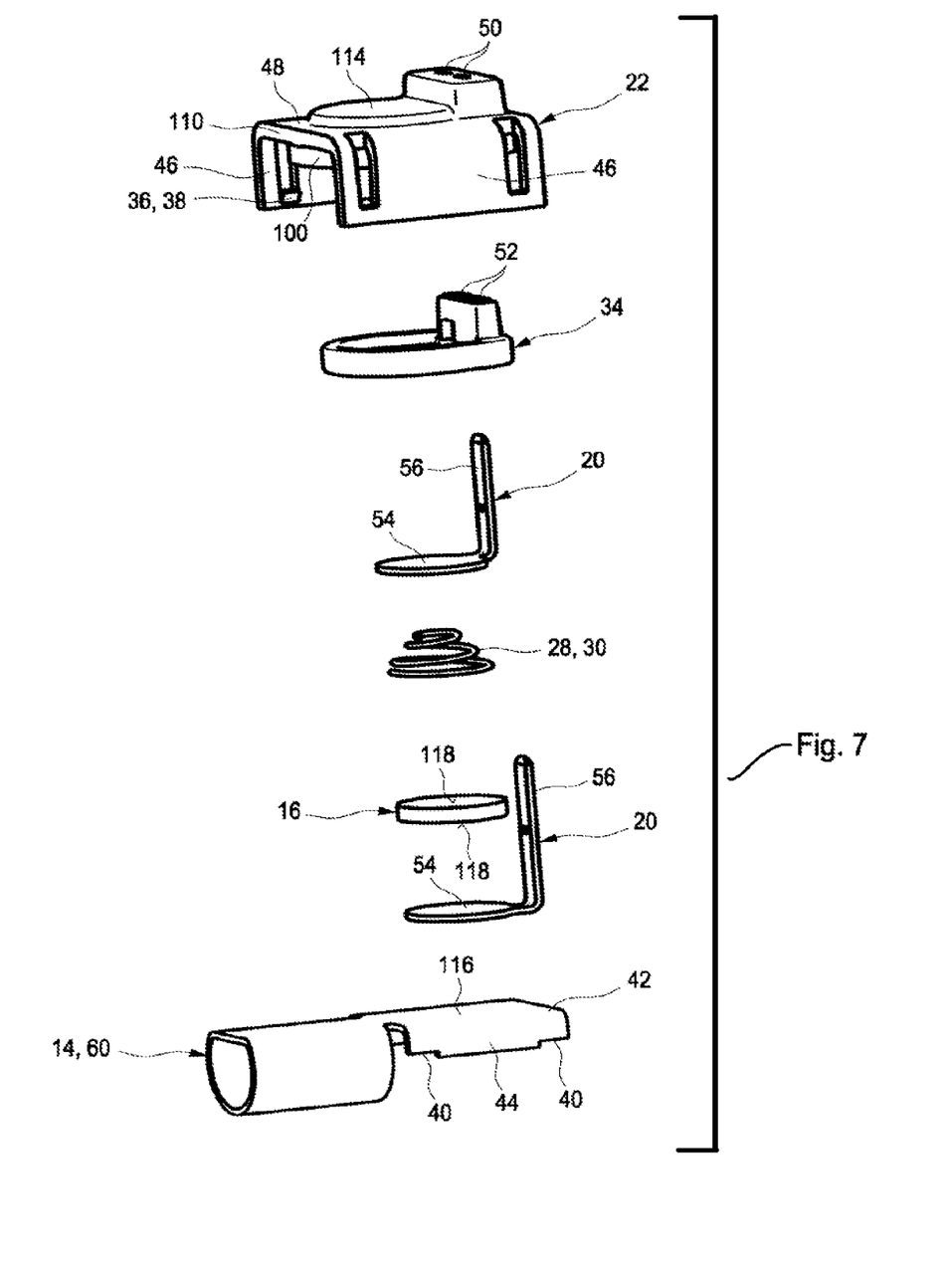
FIG. 7 is an exploded illustration of an embodiment of a pipe segment with fastening element and heating element.

Thus, FIG. 7 shows a pipe segment 16 with flat projection 42 wherein the surface of the projection 42 defines a heat introduction area 116 and comprises two angled longitudinal edge areas 44 on which, at the respective terminal edge areas, locking edges 40 are formed. Onto the heat introduction area 116, a disk-shaped contact part 54 of a first contact element 20 is placed on which a disk-shaped heating element 16 of PTC material provided with a shape-complementary disk surface 108 is seated. An electrically conducting conical spring 30 as a spring element 28 is placed thereon which is bound by a second contact element 20 also provided with a disk-shaped contact part 54 and which presses the heating element 16 against the heat introduction area 116. The two terminal parts 56 of the contact elements 20 can be pushed through push-through openings 52 of a sealing element 34 wherein the sealing element 34 delimits the heat introduction area 116 and can be inserted in a shape-complementary way into a support frame 100 of the bracket-shaped locking fastening element 22. The locking element 22 has a U-shaped profile cross-section 110 and comprises a central flank 48 in which a heating element receiving space 114 is provided that is substantially of a shape-complementary disk shape. Moreover, two push-through openings 50 are provided for pushing through the terminals 56 of the two contact elements 20. On the inner lateral flanks 46 of the fastening element 22, locking noses 38 as locking elements 36 are arranged which can lockingly engage the locking edges 40 of the flat projection 42. Due to the sandwich-type configuration, the heating element 16 is pressed between the contact parts 54 of the first and the second contact elements 20 and onto the heat-conductive heat introduction area 116 of the projection 42 of the pipe segment 60. The sealing element 34 seals the heating element 16 and the terminals 56 relative to the environment so that contaminants cannot reach the heating element 16. The multi-part configuration enables pre-assembly of the pipe segment 14 that subsequently can be embedded by injection molding within a plastic housing 26. The flat projection 42 can be angled relative to the axial extension of the pipe segment 14 so that design choices of the plastic housing 26 are enabled.

Figure 8:
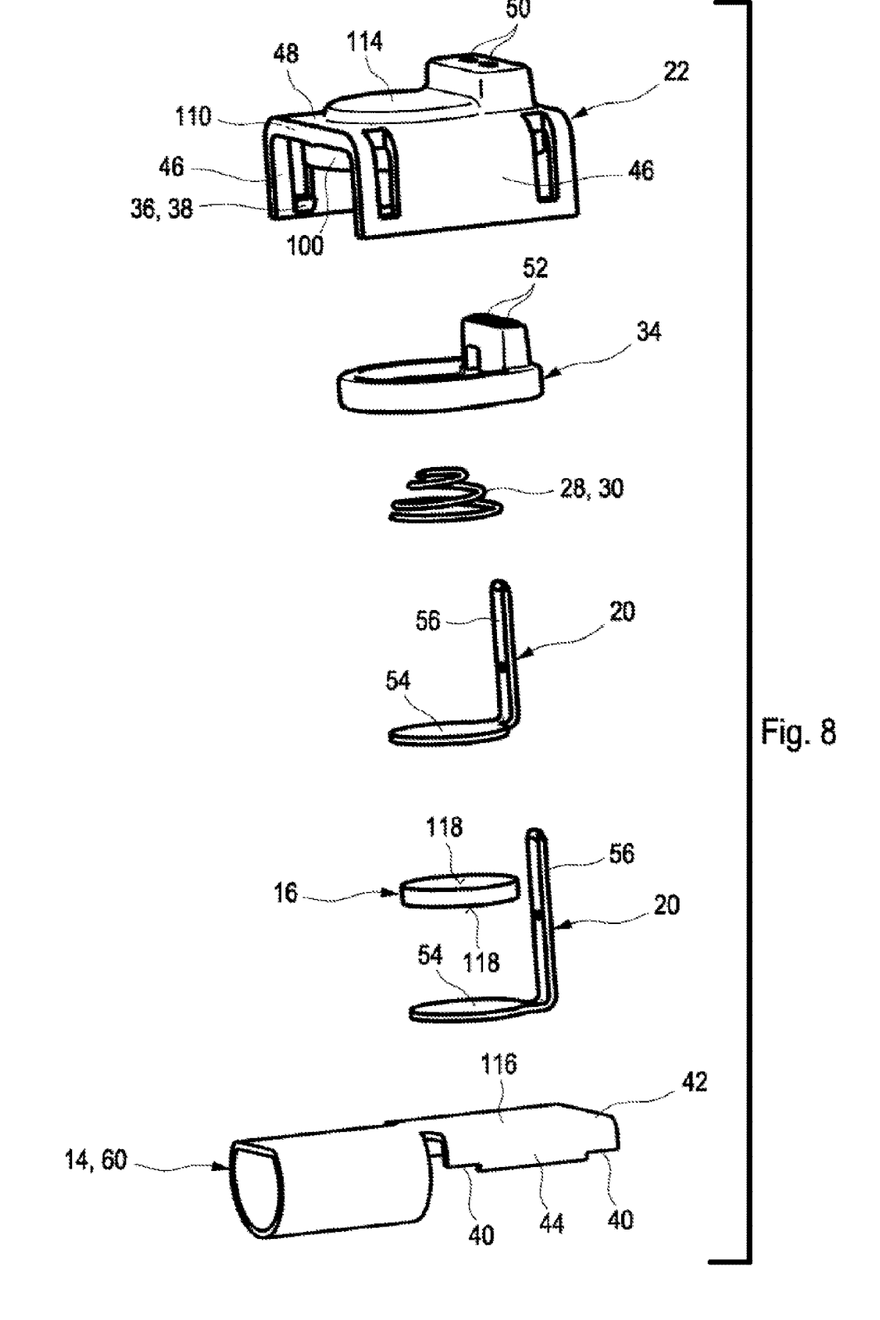
FIG. 8 is an exploded illustration of a further embodiment.

In FIG. 8, a configuration comparable to that of FIG. 7 of the pipe segment 60 with heating element 16 and fastening element 22 is illustrated but the conical spring 30 in this embodiment is arranged between fastening element 22 and the second contact element 20 and not between contact element 20 and heating element 16.

Figure 9:
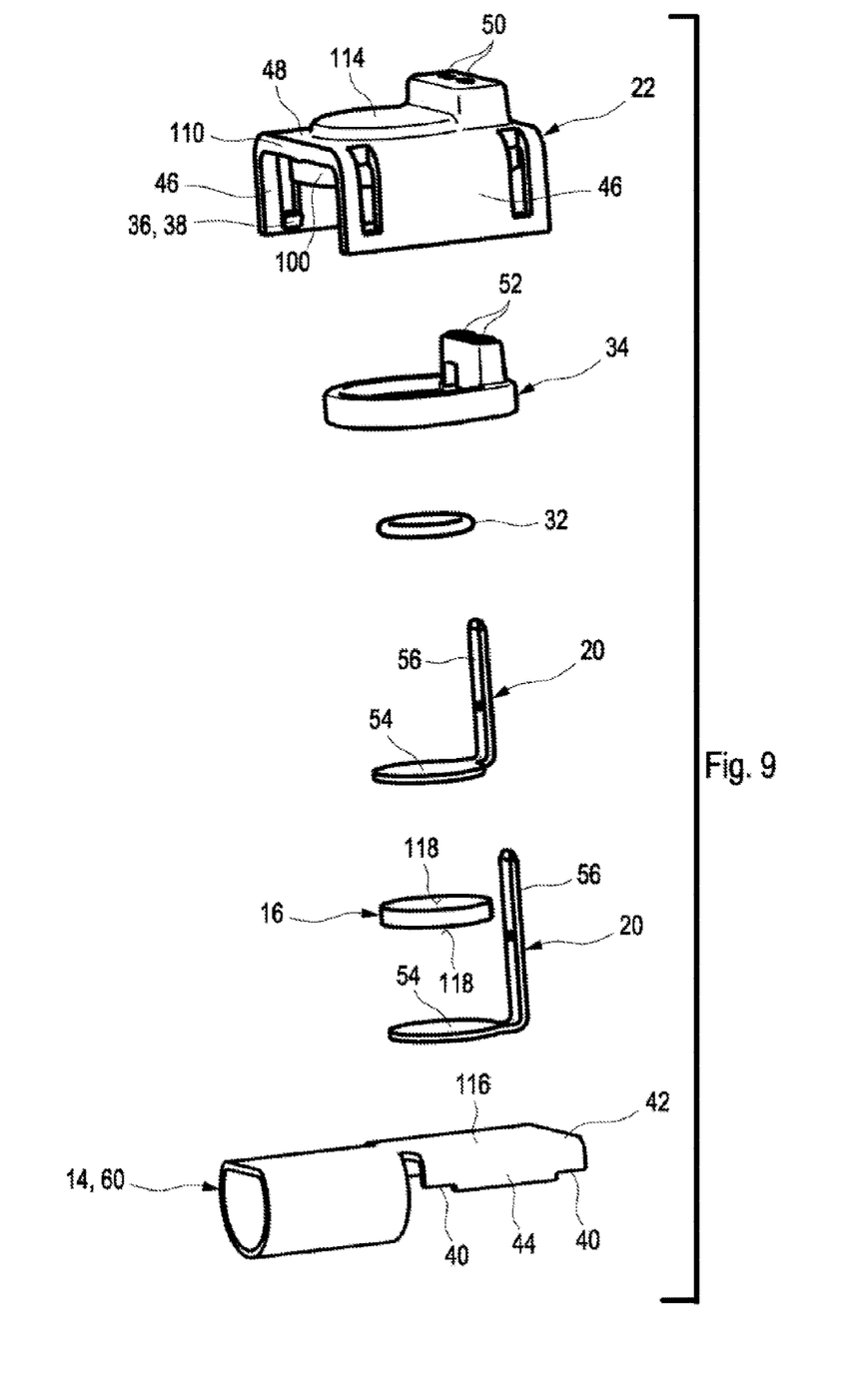
FIG. 9 is an exploded illustration of a yet another embodiment.

In FIG. 9, a configuration comparable to that of FIG. 8 is illustrated but the conical spring 30 as a spring element 28 is replaced by an elastomer O-ring spring 32.

Figure 10:
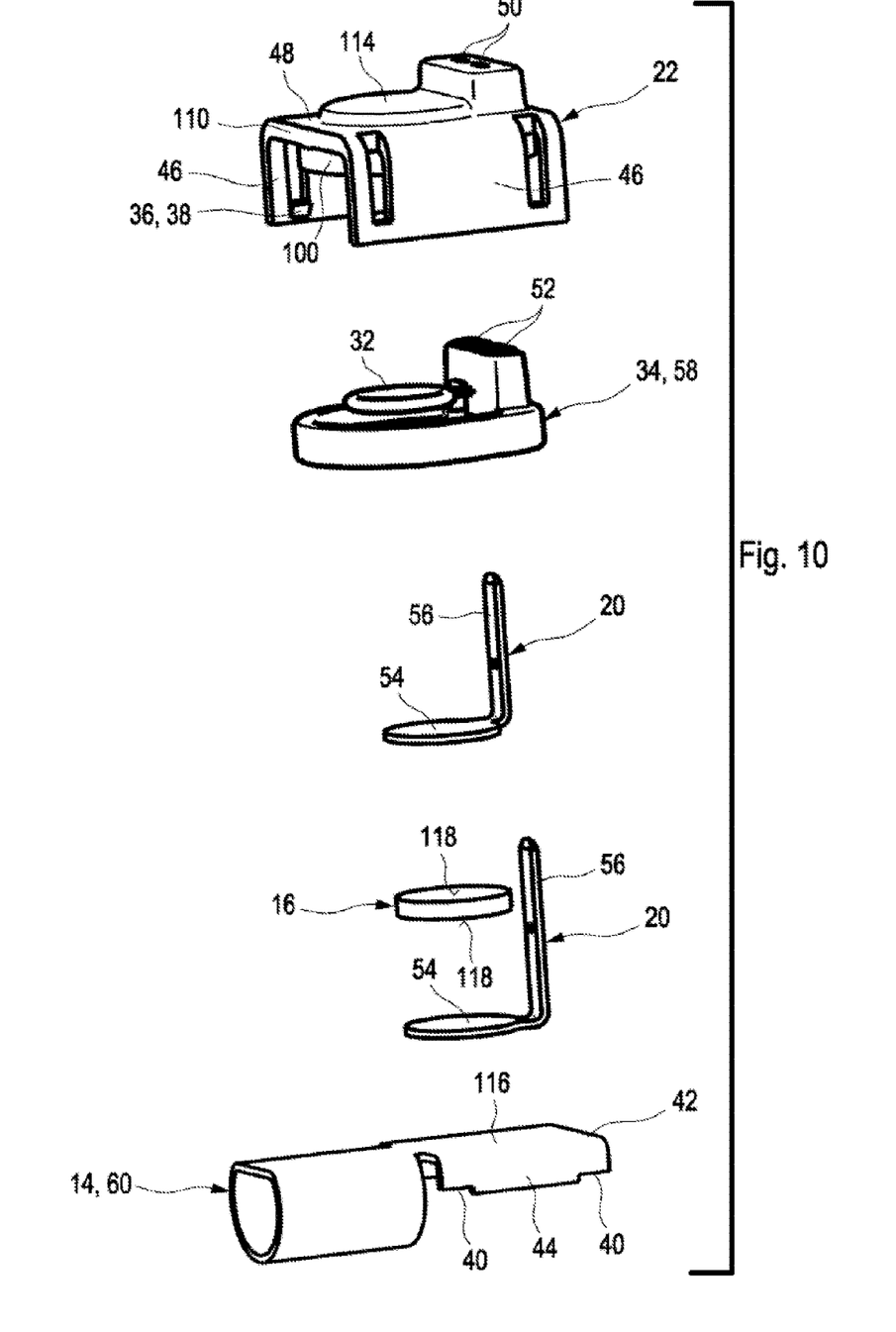
FIG. 10 is an exploded illustration of another embodiment.

In FIG. 10, this elastomer O-ring spring part 32 is formed together with the sealing element 34 as a single piece and can be formed, for example, by two-component plastic technology monolithically as sealing element 58. Accordingly, a sealing element 58 with monolithically arranged spring element 28 is formed so that the number of components can be reduced and an erroneous positioning of the spring element 28 during the mounting process can be prevented. Accordingly, a heating device can be assembled with a minimal number of components.

Figure 11:
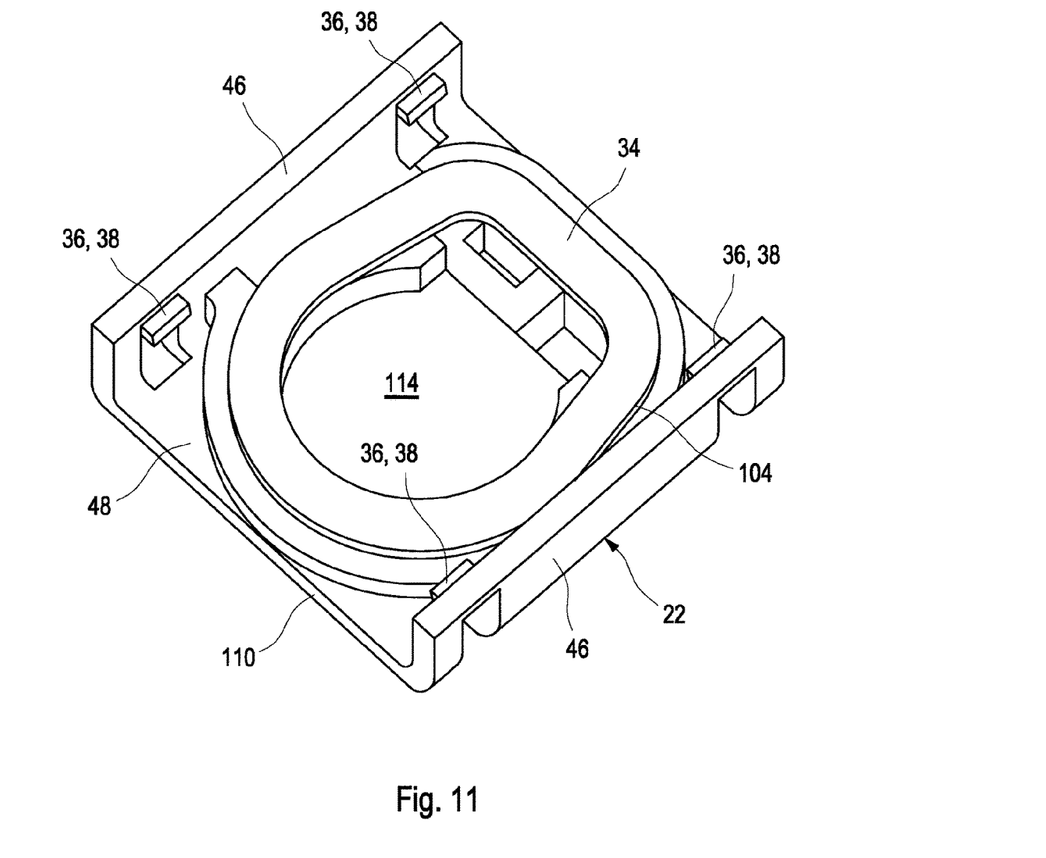
FIG. 11 is a bottom view of a fastening element with inserted sealing element.

Finally, FIG. 11 shows the bottom side of a fastening element 22 in which a sealing element 34 is inserted in a shape-complementary way into the support frame 100 of the fastening element 22 so that the through openings 52 of the sealing element are aligned with the push-through openings 50 of the fastening element 22. Such a configuration can be produced as a single piece in particular as a two-component injection-molded part so that again the number of components can be reduced and the cost can be lowered. The sealing element 34 is projecting with its projecting end 104 past the support frame 100 of the fastening element 22 so that, when locking on or screwing on the fastening element 22, the sealing element 34 reliably seals the area between heat introduction area 116 and fastening element 22. Accordingly, a fluid-tight heating area 112 in which the heating element 16 is arranged is provided.

The proposed heating device is characterized by a minimal share of components and a pre-assembly possibility for producing an intermediate product. Contact reliability is ensured by a springy element that is arranged between the fastening element and the heating element and that enables a low electrical and low heat-technical transfer resistance so that a high efficiency of the heating device can be achieved. Due to the pre-assembly by mechanical locking, the component costs and assembly expenditure are reduced and a low failure rate is achieved. The functional reliability over the service life is ensured and the heating element is protected against mechanical and thermal loads in injection molding processes, during assembly, and in operation. The sandwich-type configuration of the heating device is suitable for an automated manufacturing process. The heating device can be used in particular for heat pipes, heating elements, and heated valves for a crankcase venting device.

While specific embodiments of the invention have been shown and described in detail to illustrate the inventive principles, it will be understood that the invention may be embodied otherwise without departing from such principles.

What is claimed is:

1. A heating device for a fluid line, the heating device comprising:
   a housing having:
      a hollow first connecting member formed on a first axial end of the housing, the first connecting member configured to connect to a pipe or hose of a fluid line for fluid flow;
      a hollow second connecting member formed on an opposite second axial end of the housing, the second connecting member configured to connect to another pipe or hose of the fluid line for fluid flow;
      a hollow central heating member arranged between and separating the a first connecting member from the second connecting member, the central heating member bridging between and fluidically connecting the first connecting member to the second connecting member;
   a tubular heat-conductive pipe segment arranged within an interior of the hollow first connecting member, the heat-conductive pipe segment having a first axial end arranged at an axially outer end of the hollow first connecting member and an opposite second axial end arranged within the interior of the hollow first connecting member, proximate to the hollow central heating member;
   a U-shaped projection monolithically formed on the opposite second axial end of the tubular heat-conductive pipe segment and in an interior of the hollow central heating member, the U-shaped projection projecting outwardly away from the tubular heat-conductive pipe segment and away from the first connecting member and into an interior of the hollow central heating member, the U-shaped projection terminating before reaching the hollow second connecting member, the U-shaped projection having:
      a heat introduction surface formed by a flat base of the U-shaped projection in the interior of the hollow central heating member;
      two lateral flanks, each formed on opposite edges of the flat base of the U-shaped projection, the lateral flanks forming respective legs of the U-shaped projection, the two lateral flanks each terminating at an end edge arranged outwardly away from the flat base, the end edges and the lateral flanks spaced away from each other such that the flat base of the U-shaped projection together with the two lateral flanks form an open "U" shape of the U-shaped projection;
      wherein the lateral flanks comprise locking edges formed as indentations on the end edges of the lateral flanks;
   an electrical heating device arranged on and contacting the heat introduction surface of the U-shaped projection, including:
      an electrical heating element arranged within the hollow central heating member;

two electrical plug connection devices, each having a contact part on a first end contacting the electrical heating element and a second end forming an electrical terminal;

a U-shaped fastening element arranged in the hollow central heating member of the housing and arranged on the U-shaped projection and covering the electrical heating device, such that the electrical heating device is arranged between the U-shaped fastening element and the U-shaped projection;

wherein the U-shaped fastening element has a plurality of inwardly projecting locking noses which lock onto the locking edges of the U-shaped projection, fastening the U-shaped projection onto the U-shaped fastening element;

wherein the electrical terminals extend through openings in the U-shaped fastening element towards an exterior of the housing.

2. The heating device according to claim 1, further comprising
a spring element arranged between the U-shaped fastening element and the heating element and exerting a contact force to force the heating element into contact with the tubular heat-conductive pipe segment.

3. The heating device according to claim 1, further comprising
a sealing element arranged between the U-shaped fastening element and the electrical heating element and fluid-tightly sealing the electrical heating element relative to the exterior of the housing;
a spring element having a first side arranged on and directly contacting the electrical heating element, the spring element applying a spring force pressing the electrical heating element onto the heat introduction surface of the U-shaped projection;
wherein an opposite second side of the spring element directly contacts the contact part of a first one of the two electrical plug connection devices, such that the spring element is arranged between and is directly contacting both the first one of the two electrical plug connection devices and the electrical heating element.

4. The heating device according to claim 3, wherein
the sealing element is comprised of an elastomer and comprises push-through openings for the electrical terminals.

5. The heating device according to claim 1, wherein
the U-shaped fastening element is locked onto, screwed onto, or glued onto the U-shaped projection.

6. The heating device according to claim 1, wherein
the heating element is of a disk-shaped configuration,
wherein each of the contact parts has a shape complementary to a shape of a disk surface of the heating element for electrically contacting the disk surface,
wherein each of the electrical terminals has a pin-shaped terminal part.

7. The heating device according to claim 6, wherein
each terminal part is pushed through one of the openings of the U-shaped fastening element in a direction toward a respective one of the electrical plug connection devices.

8. The heating device according to claim 7, further comprising
a sealing element arranged between the U-shaped fastening element and the heating element,
wherein the sealing element has a push-through opening,
wherein each terminal part is pushed through one of the openings of the sealing element in a direction toward the plug connection devices.

9. The heating device according to claim 6, further comprising
a sealing element arranged between the U-shaped fastening element and the heating element,
wherein the sealing element has a push-through opening,
wherein each terminal part is pushed through one of the openings of the sealing element in a direction toward the plug connection devices.

10. The heating device according to claim 6, wherein
each terminal part is oriented at a right angle relative to a respective one of the contact parts.

11. The heating device according to claim 3, wherein
the spring element is a coil spring element.

* * * * *